(12) United States Patent
Myokan

(10) Patent No.: US 8,860,829 B2
(45) Date of Patent: Oct. 14, 2014

(54) IMAGE PROCESSING DEVICE, IMAGE PROCESSING METHOD, AND IMAGE PROCESSING PROGRAM

(75) Inventor: Yoshihiro Myokan, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/565,957

(22) Filed: Aug. 3, 2012

(65) Prior Publication Data

US 2013/0038745 A1 Feb. 14, 2013

(30) Foreign Application Priority Data

Aug. 12, 2011 (JP) ................................. 2011-176722
Dec. 7, 2011 (JP) ................................. 2011-267506

(51) Int. Cl.
- *H04N 5/228* (2006.01)
- *G06T 5/00* (2006.01)
- *G06T 7/00* (2006.01)
- *H04N 5/14* (2006.01)
- *G06T 5/50* (2006.01)
- *H04N 5/202* (2006.01)
- *H04N 13/00* (2006.01)

(52) U.S. Cl.
CPC ...... *H04N 5/144* (2013.01); *G06T 2207/20221* (2013.01); *H04N 2013/0081* (2013.01); *G06T 5/002* (2013.01); *G06T 2207/10021* (2013.01); *G06T 7/0022* (2013.01); *G06T 2207/20182* (2013.01); *G06T 2207/20012* (2013.01); *G06T 5/50* (2013.01); *H04N 5/202* (2013.01); *G06T 2207/20201* (2013.01)
USPC .................................................. 348/208.99

(58) Field of Classification Search
USPC ......................................................... 348/241
See application file for complete search history.

(56) References Cited

U.S. PATENT DOCUMENTS

| | | | | |
|---|---|---|---|---|
| 5,568,196 | A | * | 10/1996 | Hamada et al. ............. 348/416.1 |
| 5,912,973 | A | * | 6/1999 | Hiramatsu et al. .............. 380/28 |
| 6,163,337 | A | * | 12/2000 | Azuma et al. .................... 348/43 |
| 6,343,097 | B2 | * | 1/2002 | Kobayashi et al. ........... 375/240 |
| 2001/0012325 | A1 | * | 8/2001 | Kobayashi et al. ...... 375/240.26 |
| 2006/0056724 | A1 | * | 3/2006 | Le Dinh et al. ............... 382/274 |
| 2007/0293181 | A1 | * | 12/2007 | Kimura et al. ................ 455/302 |
| 2010/0123792 | A1 | * | 5/2010 | Nagumo et al. ........... 348/222.1 |

FOREIGN PATENT DOCUMENTS

JP 62-299181 12/1987

* cited by examiner

*Primary Examiner* — Aung S Moe
*Assistant Examiner* — Amy Hsu
(74) *Attorney, Agent, or Firm* — Finnegan Henderson Farabow Garrett & Dunner LLP

(57) ABSTRACT

There is provided an image processing device including a calculation section configured to calculate a feedback adjustment amount based on a change in temporal direction of a reference image which is spatially correlated with an input image, a motion compensation section configured to perform motion compensation on an output image, which is obtained from the input image of a preceding frame immediately preceding a current frame expected to be processed, based on spatial information of the reference image, and a blending section configured to generate the output image of the current frame by blending an interpolated output image obtained by the motion compensation and the input image of the current frame based on the feedback adjustment amount.

5 Claims, 9 Drawing Sheets

IMAGE PROCESSING DEVICE, IMAGE PROCESSING METHOD, AND IMAGE PROCESSING PROGRAM

BACKGROUND

The present disclosure relates to an image processing device, an image processing method and an image processing program, and more particularly, to an image processing device, an image processing method and an image processing program, capable of obtaining an image with a less noise through a filtering process.

In the past, an infinite impulse response (IIR) filter has been known as a filter for reducing a noise of an image.

Further, there has been proposed a technique for performing a filtering process of a combination of a temporal filter and a spatial filter to reduce a noise of an image (e.g., see Japanese Patent Application Publication No. S62-299181). In this technique, based on a result of detection of a motion of an image, any one of a result of noise reduction using a temporal direction of an image, i.e., a correlation between frames, and a result of noise reduction using a spatial direction of an image, i.e., a correlation between lines, is output as a result of the filtering process.

Accordingly, it is possible to obtain a greater noise reduction effect compared to a technique for using only one of the temporal filter and the spatial filter.

SUMMARY

However, it is difficult to obtain a satisfactory noise reduction effect from the above-described technique.

For example, for and IIR filter according to the related art, if a motion of a subject is detected between frames of an image, a temporal correlation with an original image is lowered in an area where there is a change in the image, i.e., an area where there is a motion in the image, resulting in motion blurring occurring in the area. On the other hand, for the technique for using a combination of the temporal filter and the spatial filter, if a target image to be processed includes a lot of noise components, it is difficult to obtain a satisfactory noise reduction effect from the technique.

In view of the foregoing situation, the present disclosure is directed to a technology for obtaining an image with a less noise through a filtering process.

According to an embodiment of the present disclosure, there is provided an image processing device including: a calculation section configured to calculate a feedback adjustment amount based on a change in temporal direction of a reference image which is spatially correlated with an input image; a motion compensation section configured to perform motion compensation on an output image, which is obtained from the input image of a preceding frame immediately preceding a current frame expected to be processed, based on spatial information of the reference image; and a blending section configured to generate the output image of the current frame by blending an interpolated output image obtained by the motion compensation and the input image of the current frame based on the feedback adjustment amount.

The motion compensation section may be configured to generate the interpolated output image by applying a weight, which is determined by a difference in luminance between a pixel of interest on the reference image of the current frame and a pixel neighboring to the pixel of interest on the reference image of the preceding frame, to a pixel neighboring to the pixel of interest in the output image of the preceding frame.

The image processing device may further include a parallax detection section configured to generate a parallax image as the input image, the parallax image indicating parallax between a right image and a left image for displaying a stereoscopic image; and a reference image generation section configured to generate the reference image based on the right image or the left image.

According to another embodiment of the present disclosure, there is provided an image processing method or an image processing program including: calculating a feedback adjustment amount based on a change in temporal direction of a reference image which is spatially correlated with an input image; performing motion compensation on an output image, which is obtained from the input image of a preceding frame immediately preceding a current frame expected to be processed, based on spatial information of the reference image; and generating the output image of the current frame by blending an interpolated output image obtained by the motion compensation and the input image of the current frame based on the feedback adjustment amount.

According to another embodiment of the present disclosure, a feedback adjustment amount is calculated based on a change in temporal direction of a reference image which is spatially correlated with an input image; motion compensation is performed on an output image, which is obtained from the input image of a preceding frame immediately preceding a current frame expected to be processed, based on spatial information of the reference image; and the output image of the current frame is generated by blending an interpolated output image obtained by the motion compensation and the input image of the current frame based on the feedback adjustment amount.

According to the embodiments of the present disclosure, it is possible to obtain the image with a less noise through a filtering process.

DETAILED DESCRIPTION OF THE EMBODIMENT(S)

Figure 1:
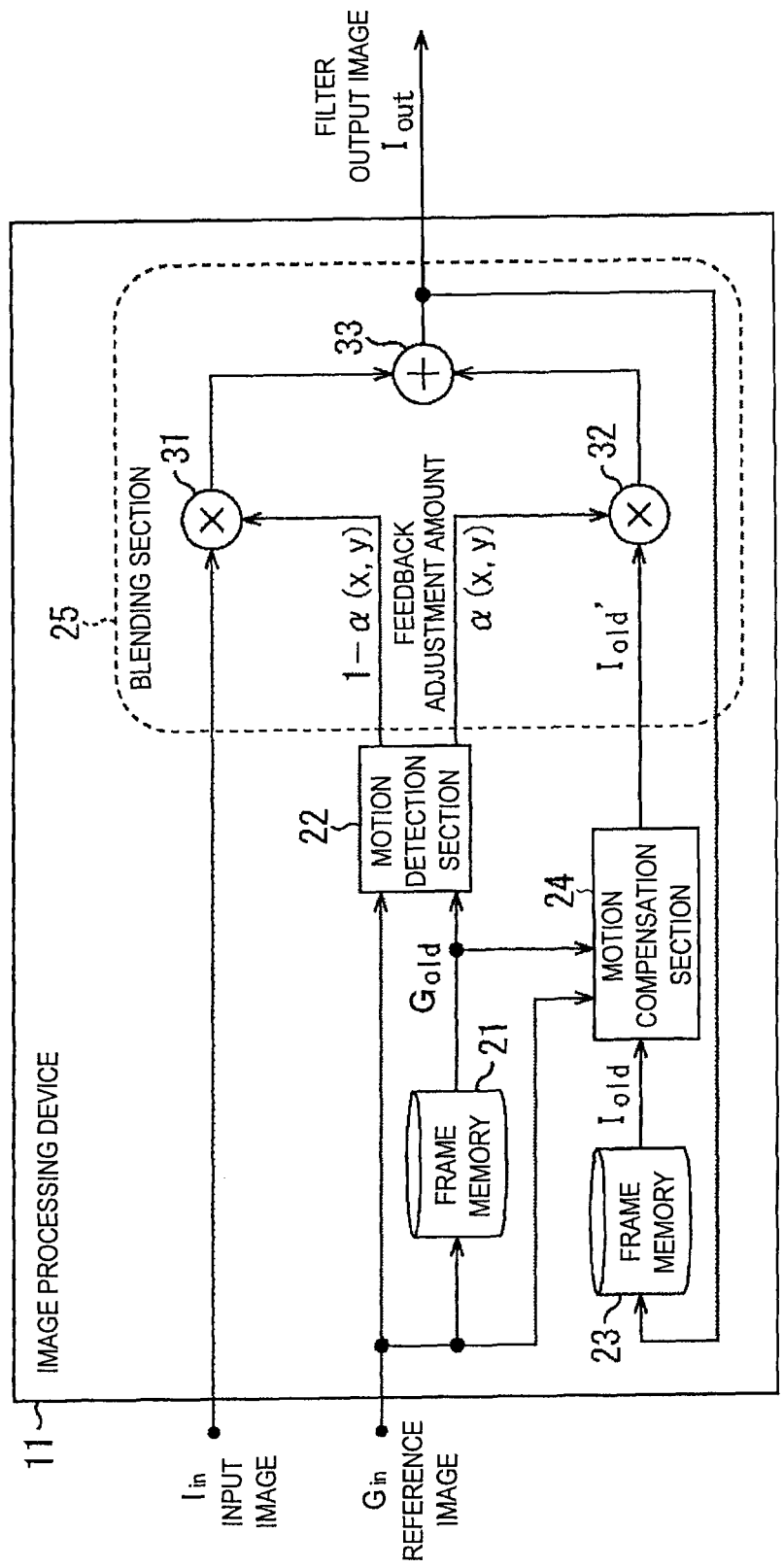
FIG. 1 is a view illustrating a structure of an image processing device according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

First Embodiment

Structure of Image Processing Device

FIG. 1 is a view illustrating a structure of an image processing device according to an embodiment of the present disclosure.

The image processing device 11 is adapted to obtain an image signal of a filter output image $I_{out}$ with a reduced noise component compared to an input image $I_{in}$ of interest by performing a spatio-temporal filtering process on the input image $I_{in}$ using an image signal of a reference image $G_{in}$ which is spatially correlated with an image signal of the input image $I_{in}$.

For example, the reference image $G_{in}$ includes information on the same subject as that of the input image $I_{in}$ and includes more information than the input image $I_{in}$, i.e., includes stochastically a less noise than the input image $I_{in}$. Specifically, for example, since the input image $I_{in}$ and the reference image $G_{in}$ are images generated from the same image, a pixel of the input image $I_{in}$ and a pixel of the reference image $G_{in}$ which is located at the same position as that of the pixel of the input image $I_{in}$ include information on the same position of the same subject. That is, the input image $I_{in}$ and the reference image $G_{in}$ are spatially correlated with each other.

The image processing device 11 includes a frame memory 21, a motion detection section 22, a frame memory 23, a motion compensation section 24, and a blending section 25.

The frame memory 21 temporarily stores and maintains a reference image of a supplied frame expected to be processed (hereinafter referred to as "current frame"), delays the reference image by a period of time corresponding to one frame, and supplies the reference image to the motion detection section 22 and the motion compensation section 24. The motion detection section 22 performs motion detection from the reference image of the supplied current frame and a reference image of a frame which precedes the current frame by one frame, i.e., a frame which immediately precedes the current frame (hereinafter referred to as "a preceding frame"), which is supplied from the frame memory 21. The motion detection section 22 calculates a feedback adjustment amount based on the detection result and supplies the feedback adjustment amount to the blending section 25.

The feedback adjustment amount refers to an IIR feedback amount representing a contribution rate of a filter output image of a motion-compensated preceding frame to generation of a filter output image of a current frame.

The frame memory 23 delays a filter output image supplied from the blending section 25 by a period of time corresponding to one frame and supplies the filter output image to the motion compensation section 24. The motion compensation section 24 performs motion compensation of the supplied reference image, the reference image of the preceding frame from the frame memory 21, and the filter output image of the preceding frame from the frame memory 23. The motion compensation section 24 supplies the motion-compensated filter output image to the blending section 25.

The blending section 25 blends the supplied input image and the filter output image from the motion compensation section 24 based on the feedback adjustment amount from the motion detection section 22 and outputs a filter output image of the current frame.

The blending section 25 includes a multiplier 31, a multiplier 32, and an adder 33. The multiplier 31 multiplies the supplied input image by the feedback adjustment amount supplied from the motion detection section 22 and supplies the product of the input image and the feedback adjustment amount to the adder 33.

The multiplier 32 multiplies the filter output image of the preceding frame supplied from the motion compensation section 24 by the feedback adjustment amount supplied from the motion detection section 22 and supplies the product of the filter output image of the preceding frame and the feedback adjustment amount to the adder 33. The adder 33 adds the input image from the multiplier 31 and the filter output image from the multiplier 32 and outputs the sum of the input image and the filter output image as the filter output image of the current frame.

Filter Updating Process

When the image processing device 11 of FIG. 1 receives the input image and the reference image and is instructed to perform a spatio-temporal filtering process on the input image, the image processing device 11 performs a filter updating process to generate a filter output image and outputs the filter output image. The filter updating process of the image processing device 11 will be described with reference to the flow chart of FIG. 2.

In step S11, the motion detection section 22 calculates a feedback adjustment amount based on a difference between frames of the reference image.

That is, if a reference image of a current frame is supplied to the image processing device 11, the frame memory 21 supplies a reference image of a preceding frame, which is previously supplied and stored therein, to the motion detection section 22 and the motion compensation section 24.

The motion detection section 22 calculates a difference evaluation value representing a difference between the reference image of the supplied current frame and the reference image of the preceding frame from the frame memory 21.

Specifically, for example, the motion detection section 22 calculates an absolute value of a difference between a pixel value (luminance value) of a pixel at coordinates (x, y) of the reference image of the current frame, $G(x,y)$, and a pixel value of a pixel at the coordinates (x, y) of the reference image of the preceding frame, $G_{old}(x,y)$, as a difference evaluation value $d(x,y)$ at the coordinates (x,y) from the following equation 1.

$$d(x,y) = |G(x,y) - G_{old}(x,y)| \tag{1}$$

The coordinates (x,y) represent an x coordinate and a y coordinate in a coordinate system where x- and y-directions which are orthogonal to each other on the reference image are set as x- and y-axes, respectively. The difference evaluation value $d(x,y)$ may be any value that represents a difference amount between the reference image of the current frame and the reference image of the preceding frame.

After calculating the difference evaluation value $d(x,y)$, the motion detection section 22 calculates a feedback coefficient $\alpha(x,y)$ at the coordinates (x,y) from the following equation 2.

$$\alpha(x,y) = g(d(x,y)) \tag{2}$$

In other words, the motion detection section 22 calculates the feedback coefficient $\alpha(x,y)$ by substituting the difference evaluation value $d(x,y)$, which is obtained from the equation 1, for k in a predetermined function $g(k)$.

For example, the function $g(k)$ is a function for determining an IIR feedback amount according to the difference evaluation value d(x,y). The function g(k) is configured to reduce an IIR feedback amount of a part in which there is a motion in the reference image, and output a feedback coefficient α(x,y), which is applied to the input image of the current frame. Specifically, the function g(k) is a function expressed by, for example, the following equation 3.

$$g(k) = \begin{cases} \alpha & (k \le k_0) \\ \alpha\left(1 - \dfrac{k - k_0}{k_1 - k_0}\right) & (k_0 < k \le k_1) \\ 0 & (k_1 < k) \end{cases} \quad (3)$$

In the equation 3, α is a feedback coefficient α(x,y) when there is no motion between frames of the reference image, e.g., α=0.9375. Further, $k_0$ and $k_1$ are thresholds indicating a range of difference evaluation values that continuously decreases the feedback coefficient through detection of a motion between frames of the reference image, e.g., $k_0$=5 and $k_1$=15.

Figure 3:
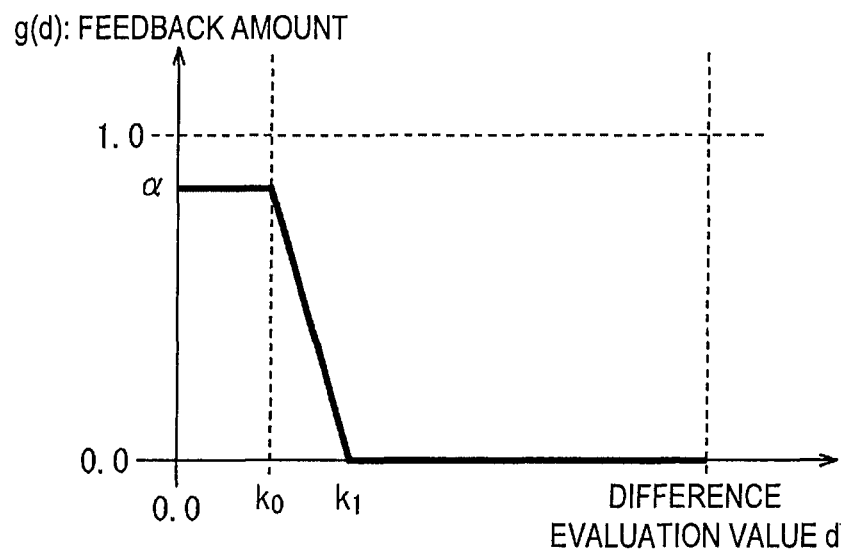
FIG. 3 is a view illustrating a relationship between a difference evaluation value and a feedback amount.

Accordingly, for example, as shown in FIG. 3, the smaller difference evaluation value d(x,y), the greater value of the function g(k), i.e., the greater feedback coefficient α(x,y). In FIG. 3, the horizontal axis represents the difference evaluation value d(x,y) and the vertical axis represents the value of the function g(k).

For example, in FIG. 3, the function g(k)=α for a difference evaluation value d(x,y) between 0 and $k_0$. The function g(k)= α(1−((k−$k_0$)/($k_1$−$k_0$))) for a difference evaluation value d(x, y) between $k_0$ and $k_1$, i.e., $k_0$<d(x,y)≤$k_1$. In other words, as the difference evaluation value increases, the function g(k) linearly decreases. The function g(k)=0 for a difference evaluation value d(x,y) which is greater than $k_1$.

The motion detection section 22 supplies the feedback coefficient α(x,y), which is thus obtained, to the multiplier 32 as a feedback adjustment amount of the filter output image of the preceding frame. Further, the motion detection section 22 supplies a value (1−α(x,y)), which is obtained by subtracting the feedback coefficient α(x,y) from 1, to the multiplier 31 as a feedback adjustment amount of the input image.

The greater difference between frames of the reference image, i.e., the more motion in a subject in the reference image, the less feedback adjustment amount α(x,y) which is multiplied by the filter output image of the preceding frame. In other words, in an area where there is a great motion in the reference image, a contribution rate of the filter output image of the preceding frame to generation of the filter output image of the current frame is lowered, thereby suppressing the occurrence of motion blurring in the filter output image.

Figure 2:
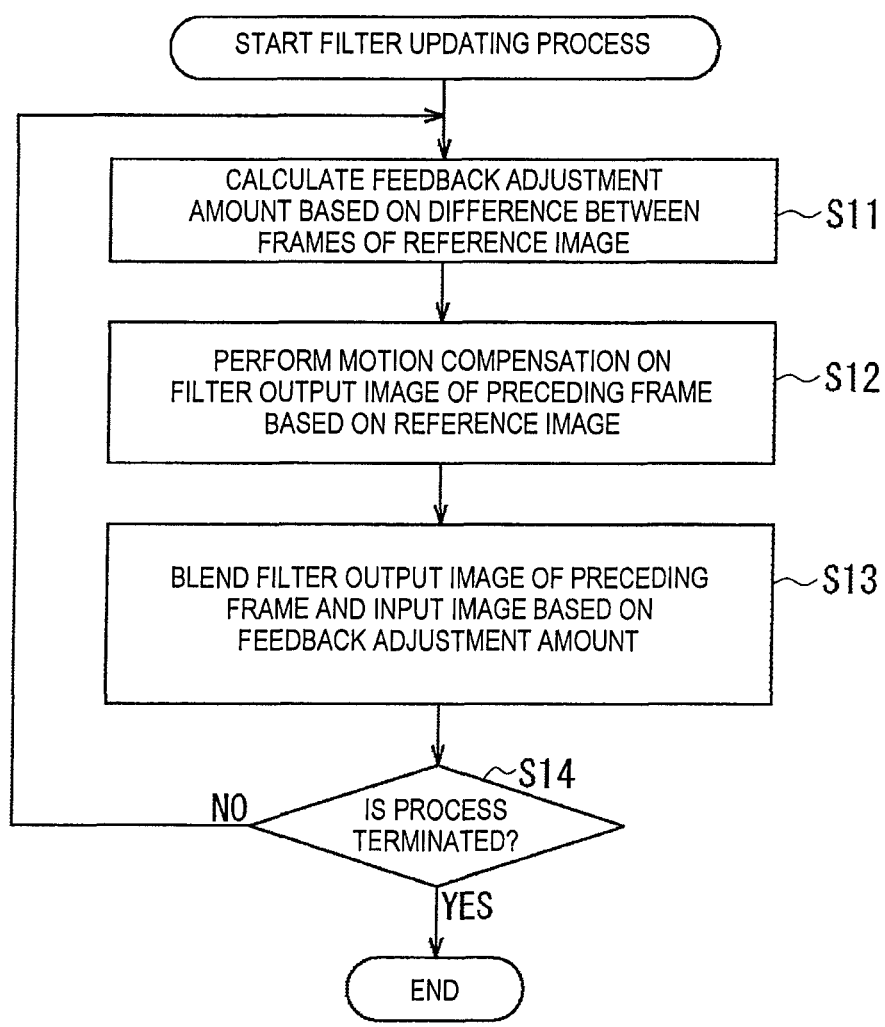
FIG. 2 is a flow chart illustrating a filter updating process.

Referring back to the flow chart of FIG. 2, in step S12, the motion compensation section 24 performs motion compensation of the filter output image of the preceding frame based on the reference image and supplies the motion-compensated filter output image to the multiplier 32. In other words, the motion compensation section 24 performs the motion compensation of the filter output image of the preceding frame using texture information of the reference image of the current frame.

For example, if the reference image of the current frame is supplied to the motion compensation section 24, the frame memory 23 supplies the filter output image of the preceding frame, which is already supplied from the adder 33 and stored therein, to the motion compensation section 24. The frame memory 21 also supplies the reference image of the preceding frame to the motion compensation section 24.

The motion compensation section 24 obtains a motion-compensated filter output image of the preceding frame from the following equation 4 based on the supplied reference image of the current frame, the reference image of the preceding frame from the frame memory 21, and the filter output image of the preceding frame from the frame memory 23. In other words, a pixel value $I_{old}'(x,y)$ of a pixel at the coordinates (x,y) of the motion-compensated filter output image of the preceding frame is calculated.

$$I_{old}'(x, y) = \dfrac{\sum_{i=-M}^{M} \sum_{j=-M}^{M} \langle w(|G_{old}(x+i, y+j) - G(x, y)|) I_{old}(x+i, y+j) \rangle}{\sum_{i=-M}^{M} \sum_{j=-M}^{M} w(|G_{old}(x+i, y+j) - G(x, y)|)} \quad (4)$$

In the equation 4, $G_{old}(x+i, y+j)$ represents a pixel value (luminance value) of a pixel at the coordinates (x+i, y+j) of the reference image of the preceding frame, and G(x,y) represents a pixel value (luminance value) of a pixel at the coordinates (x,y) of the reference image of the current frame. Further, $I_{old}(x+i, y+j)$ represents a pixel value of a pixel at the coordinates (x+i, y+j) of the filter output image of the preceding frame, and the function w(k) represents a predetermined function.

It is assumed that a pixel of the reference image of the current frame, which is located at the coordinates (x,y), is referred to as a pixel of interest and a block made up of (2M+1)×(2M+1) pixels is referred to as a block of interest, where a pixel of the reference image of the preceding frame, which is located at the same position as that of the pixel of interest, is located at the center of the (2M+1)×(2M+1) pixels. In this case, the pixel value $I_{old}'(x,y)$ may be obtained by weighting a pixel within the same area of the filter output image of the preceding frame as the block of interest by a weight based on an absolute value of a difference in luminance between a pixel within the block of interest of the reference image of the preceding frame and the pixel of interest. In other words, the pixel value $I_{old}'(x,y)$ is obtained through interpolation by the weight based on the absolute value of the difference in luminance around the pixel of interest of the reference image.

The constant M for determining the size of the block of interest indicates what pixels are searched in x-axis and y-axis directions with respect to the coordinates (x,y) of the pixel of interest. For example, if a block of 3 pixel×3 pixel is the block of interest, M=(3−1)/2=1.

In the equation 4, the function w(k) is a function of weight where the weight increases as the difference in luminance of a pixel of a reference image, i.e., k=|$G_{old}$(x+i,y+j)−G(x,y)|, decreases. For example, the function w(k) is expressed by the following equation 5.

$$W(k) = e^{-\frac{1}{2\sigma^2}\left(\frac{k}{N}\right)^2} \quad (5)$$

In the equation 5, N represents the maximum possible value of a pixel value of a pixel of the reference image. For example, if the pixel value is any one of 0 to 255 with 8-bit degree of precision, N=255. Further, in the equation 5, $\sigma^2$ represents a variance, e.g., $\sigma^2$=0.01.

Figure 4:
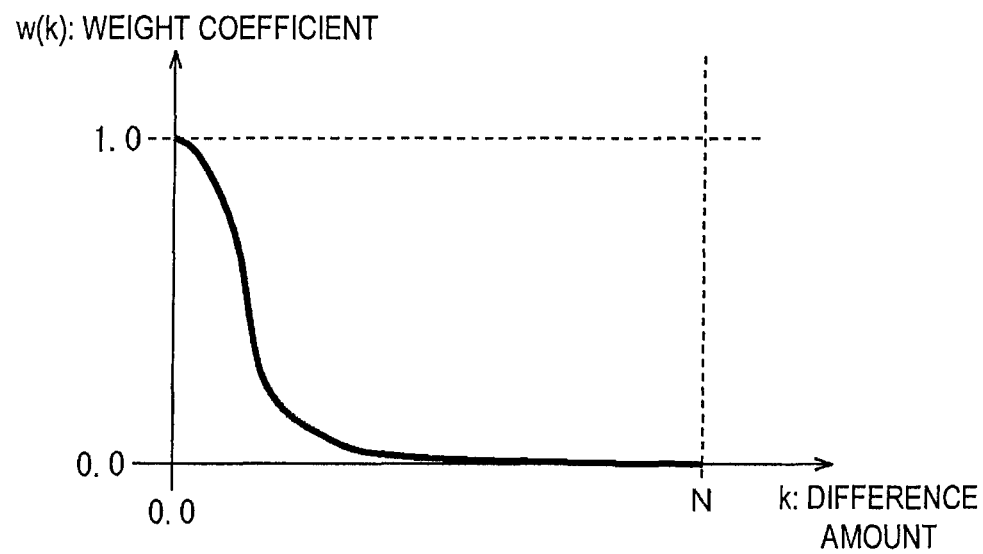
FIG. 4 is a view illustrating a relationship between a difference amount and a weight coefficient.

Accordingly, for example, as shown in FIG. 4, as the difference in luminance of a pixel of the reference image, i.e., |$G_{old}$(x+i,y+j)−G(x,y)|, decreases, a value of the function w(k) indicating a weight multiplied by a pixel of the filter output image increases. In other words, as a change in luminance of a pixel in the reference image is small and an area with no motion in a subject is large, a contribution rate to the filter output image generated through the motion compensation increases, thereby suppressing the occurrence of motion blurring in the filter output image.

A pixel of the reference image of the preceding frame which is small in luminance difference with the pixel of interest of the reference image of the current frame (hereinafter referred to as "reference pixel") is very likely to be a pixel which is highly correlated with the pixel of interest (similar pixel) and has information on the same subject as the pixel of interest. In other words, the reference pixel is very likely to be a pixel of a motion location of the pixel of interest.

The filter output image and the reference image are spatially correlated to each other. Accordingly, a pixel on the filter output image of the current frame, which is located at the same position as that of the pixel of interest, and a pixel on the filter output image of the preceding frame, which is located at the same position as that of the reference pixel, may have the same degree of correlation as the pixel of interest and the reference pixel.

Accordingly, if each pixel neighboring to a pixel on the filter output image of the preceding frame, which is located at the same position as that of the pixel of interest, is weighted by a weight obtained from a difference in luminance of a pixel of the reference image, an estimated value of a pixel on the filter output image of the current frame, which is located at the same position as that of the pixel of interest, may be obtained. The filter output image obtained from the equation 4 is the filter output image of the current frame, which is estimated through the motion compensation of the filter output image of the preceding frame.

The calculation of the value of the function w(k), i.e., the weight, is not limited to the equation 5 but may be performed by table lookup process or piecewise linear approximation. Further, in order to reduce processing costs (see memory) by sacrificing some interpolation performance, after the pixel value $G_{old}(x+i, y+j)$ is substituted with a pixel value of a pixel of the reference image of the current frame, i.e., $G(x+i, y+j)$, in the equation 4, interpolation using information on only the reference image of the current frame may be performed.

Figure 5:
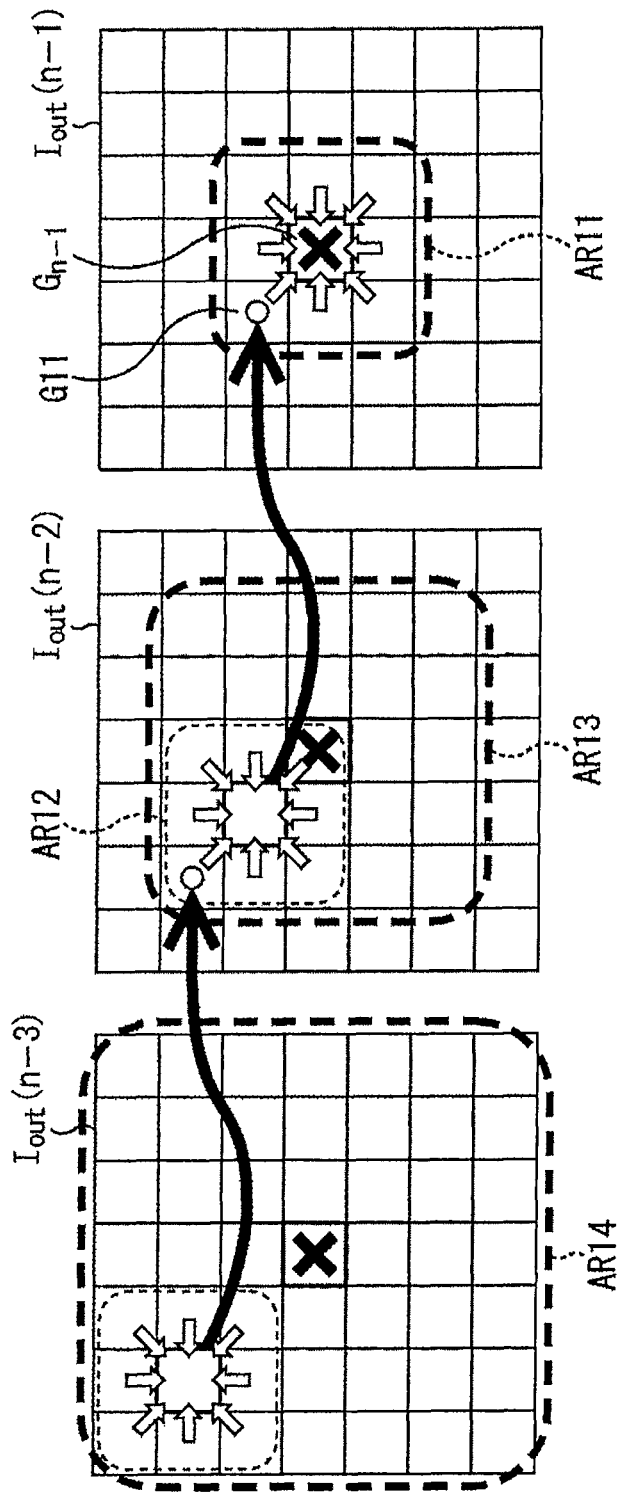
FIG. 5 is a view illustrating an effect which is obtained by a combination of motion compensation and infinite impulse response (DR) filtering process.

Referring back to the flow chart of FIG. 5, in step S13, the blending section 25 blends the filter output image of the preceding frame from the motion compensation section 24 and the supplied input image of the current frame based on the feedback adjustment amount from the motion detection section 22.

Specifically, the multiplier 31 multiplies a pixel value $I_{in}(x,y)$ of the pixel at the coordinates (x,y) of the supplied input image by the feedback adjustment amount $(1-\alpha(x,y))$ supplied from the motion detection section 22 and supplies the product of the pixel value $I_{in}(x,y)$ and the feedback adjustment amount $(1-\alpha(x,y))$ to the adder 33. The multiplier 32 multiplies a pixel value $I_{old}'(x,y)$ of the pixel at the coordinates (x,y) of the motion-compensated filter output image of the preceding frame supplied from the motion compensation section 24 by the feedback adjustment amount $\alpha(x,y)$ supplied from the motion detection section 22, and supplies the product of the pixel value $I_{old}'(x,y)$ and the feedback adjustment amount $\alpha(x,y)$ to the adder 33.

The adder 33 adds the pixel value of the pixel of the input image from the multiplier 31 and the pixel value of the pixel of the filter output image from the multiplier 32 to generate a pixel value $I_{out}(x,y)$ of the pixel at the coordinates (x,y) of the filter output image of the current frame, and outputs the filter output image thus obtained.

By the above-mentioned process, the calculation of the following equation 6 is performed. That is, the infinite impulse response (IIR) filtering process is performed on the image signal of the input image based on the feedback coefficient $\alpha(x,y)$, thereby generating the image signal of the filter output image.

$$I_{out}(x,y)=(1-\alpha(x,y))I_{in}(x,y)+\alpha(x,y)I_{old}'(x,y) \quad (6)$$

In step S14, the image processing device 11 determines whether or not the filter updating process is terminated. For example, if the filter updating process is performed on all frames of the input image, it is determined that the filter updating process is terminated.

If it is determined in step S14 that the filter updating process is not terminated, the filter updating process returns to the step S11 and the above-mentioned processes are repeatedly performed.

If it is determined in step S14 that the filter updating process is terminated, each element of the image processing device 11 stops processing and the filter updating process is terminated.

As described above, the image processing device 11 detects the motion of the reference image, determines a feedback adjustment amount based on the detection result, and controls a contribution rate of the filter output image of the preceding frame to generation of the filter output image of the current frame. Further, the image processing device 11 performs the motion compensation of the filter output image of the preceding frame based on the spatial correlation of the reference image and blends the motion-compensated filter output image and the input image to generate the filter output image of the current frame.

Accordingly, by the control of the feedback adjustment amount or the motion compensation of the filter output image, it is possible to simply obtain the filter output image with a less noise component.

For only a simple IIR filter according to the related art, if there is a motion of a subject in an input image, motion blurring occurs in an area of the motion in a filter output image. On the contrary, if there is an image which is spatially correlated with the input image and has statistically a less noise component compared to the input image, it is possible to improve the motion blurring occurring in the area of the motion by using the image as a reference image and performing the spatio-temporal motion compensation on the reference image according to the present technology.

In addition, by combining the motion compensation of the filter output image and the infinite impulse response (IIR) filtering process of the input image, it is possible to perform the motion compensation for a wider range.

For example, as shown in the right of FIG. 5, it is assumed that a target pixel on the filter output image $I_{out}(n-1)$ of the frame (n-1) is referred to as a pixel of interest $G_{n-1}$ and a block of interest in the calculation of the motion compensation from the equation 4 has the size of 3 pixel×3 pixel. Further, in FIG. 5, one square on each image represents one pixel.

In this case, the area AR11 made up of 3×3 pixels in the filter output image $I_{out}(n-1)$ is a reference range where the pixel of interest $G_{n-1}$ is located at the center, and a pixel located at the same position as that of the pixel of interest $G_{n-1}$ is obtained in the filter output image of the frame (n-1) after the motion compensation. That is, by the filtering process using a pixel in the area AR11, the pixel value $I_{old}'(x,y)$ of the pixel of the filter output image of the frame (n-1) after the motion compensation, which is located at the same position as that of the pixel of interest $G_{n-1}$, is calculated from the equation 4.

Further, from the equation 6, each pixel of the filter output image of the frame n is generated by blending a pixel of the input image of the frame n and a pixel of the motion-compensated filter output image of the frame (n−1), where the pixels are located at the same position.

Accordingly, the pixel of the filter output image of the frame n may be generated by blending the pixel of the input image of the frame n and a filter output in a reference range of 3×3 pixels of the filter output image of the frame (n−1).

Further, considering a frame immediately preceding the frame (n−1), for example, the pixel G11 within the area AR11 is generated by blending a filter output in a reference range which corresponds to the area AR12 of the filter output image $I_{out}$(n−2) of the frame (n−2) and a pixel of the input image of the frame (n−1). The area AR12 is an area made up of 3×3 pixels where a pixel on the filter output image $I_{out}$(n−2) which is located at the same position as that of the pixel G11 is located at the center of the area AR12.

Accordingly, it can be seen that the area AR11 of the filter output image $I_{out}$(n−1) is generated by blending the input image of the frame (n−1) and the filter output in the reference range which corresponds to the area AR13 of the filter output image $I_{out}$(n−2). The area AR13 is an area made up of 5×5 pixels where a pixel on the filter output image $I_{out}$(n−2) which is located at the same position as that of the pixel of interest $G_{n-1}$ is located at the center of the area AR13.

Further, considering a frame immediately preceding the frame (n−2), the area AR13 is generated by blending the input image of the frame (n−2) and a filter output in a reference range which corresponds to the area AR14 of the filter output image $I_{out}$(n−3) of the frame (n−3). The area AR14 is an area made up of 7×7 pixels where a pixel on the filter output image $I_{out}$(n−3) which is located at the same position as that of the pixel of interest $G_{n-1}$ is located at the center of the area AR14.

As such, the image processing device 11 that performs a combination of the motion compensation and the IIR filtering process references a reference range on a filter output area of each of previous frames to generate a pixel of a filter output image after the motion compensation. Further, it can be seen that the older frame is considered, the wider reference range on the filter output image which is referenced to generate the pixel of the filter output image after the motion compensation.

Accordingly, although the motion compensation is performed on the block of interest with a relatively small area, such as the size of 3×3 pixels, in the calculation of the equation 4, information on a wide area of pixels may be referenced by repeatedly performing the IIR filtering process. That is, it is possible to perform the motion compensation by referencing a substantially wide reference range of the filter output image. Further, since the reference range is wide, it is also possible to obtain a noise reduction effect due to spatial anti-aliasing.

As such, by performing a combination of the motion compensation and the IIR filtering process, it is possible to significantly reduce the amount of calculation per frame in the motion compensation using a narrow reference range and obtain the same effect as that of a case where the motion compensation is performed in a wide reference range.

Second Embodiment

Structure of Image Processing Device

Figure 6:
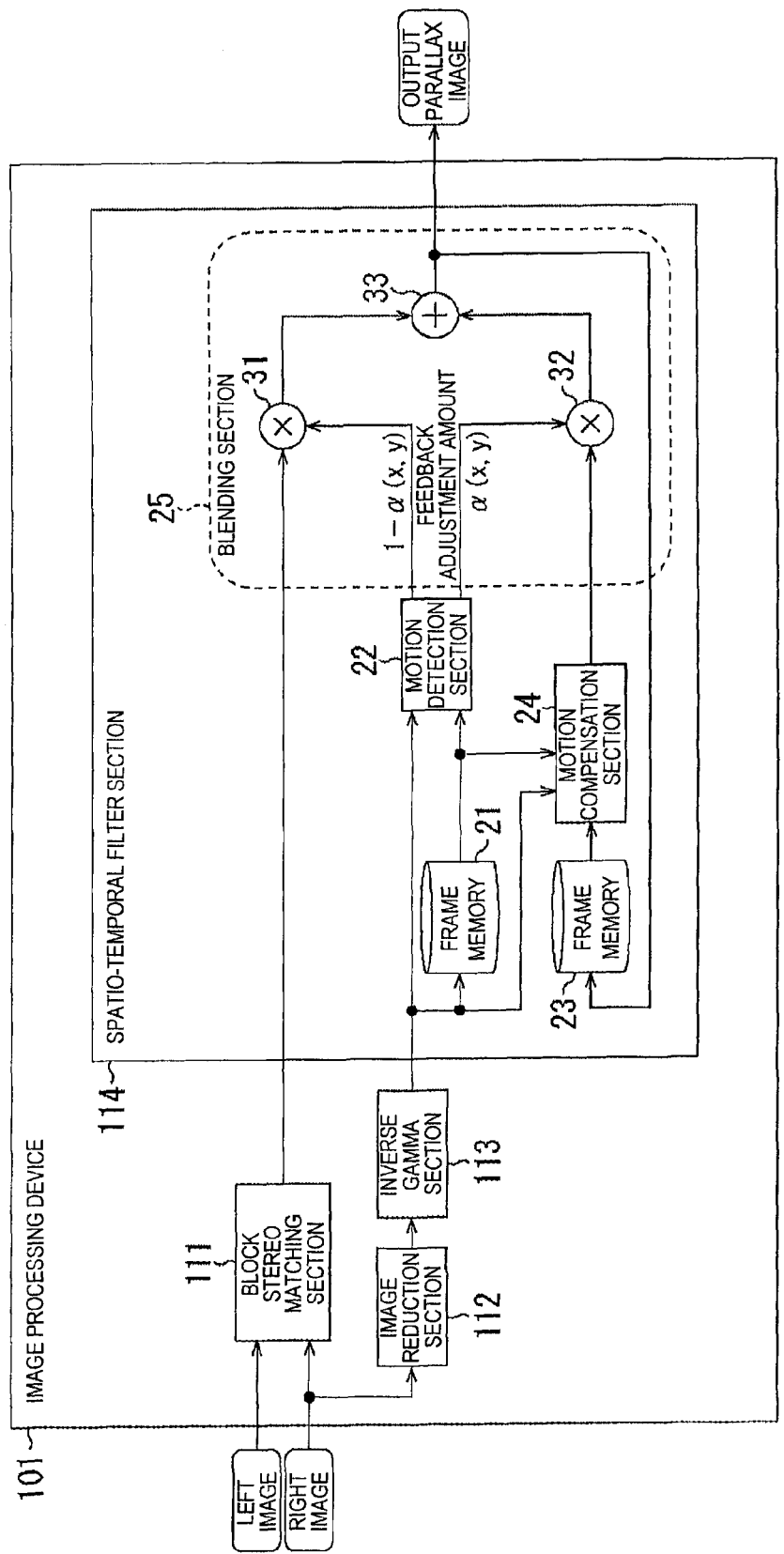
FIG. 6 is a view illustrating a structure of an image processing device according to another embodiment of the present disclosure.

The spatio-temporal filtering process may be applied to, for example, parallax detection of a stereoscopic image by a stereo camera. In this case, an image processing device performing the parallax detection may be configured, for example, as shown in FIG. 6. In FIG. 6, elements corresponding to those of FIG. 1 are denoted by the same reference numerals and a detailed description thereof will thus be omitted.

In FIG. 6, the image processing device 101 includes a block stereo matching section 111, an image reduction section 112, an inverse gamma section 113 and a spatio-temporal filter section 114.

The image processing device 101 receives an image signal of a left image and an image signal of a right image, which form a stereoscopic image. The left image and the right image are images that are obtained by capturing the same subject from different viewpoints and have parallax to each other.

The block stereo matching section 111 performs a stereo matching process on a predetermined size of a block unit based on the left image and the right image to generate an input parallax image indicating parallax of each area of the left image and the right image. The block stereo matching section 111 supplies the generated input parallax image to the spatio-temporal filter section 114.

Hereinafter, the stereo matching process will be described where the right image is considered a base image.

The image reduction section 112 reduces the supplied right image to generate a reduced image and supplies the reduced image to the inverse gamma section 113. The inverse gamma section 113 performs an inverse gamma process on the reduced image supplied from the image reduction section 112 and supplies the inverse-gamma-processed reduced image to the spatio-temporal filter section 114.

The spatio-temporal filter section 114 performs the spatio-temporal filtering process on the input parallax image from the block stereo matching section 111 using the reduced image from the inverse gamma section 113 to generate and output an output parallax image with a reduced noise component compared to the input parallax image.

The spatio-temporal filter section 114 includes the frame memory 21, the motion detection section 22, the frame memory 23, the motion compensation section 24, and the blending section 25, which are configured in the same manner as those of the image processing device 11 of FIG. 1. In the spatio-temporal filter section 114, the input parallax image, the inverse-gamma-processed reduced image, and the output parallax image correspond to the input image $I_{in}$, the reference image $G_{in}$, and the filter output image $I_{out}$, respectively.

Target Image to be Processed

Figure 7:
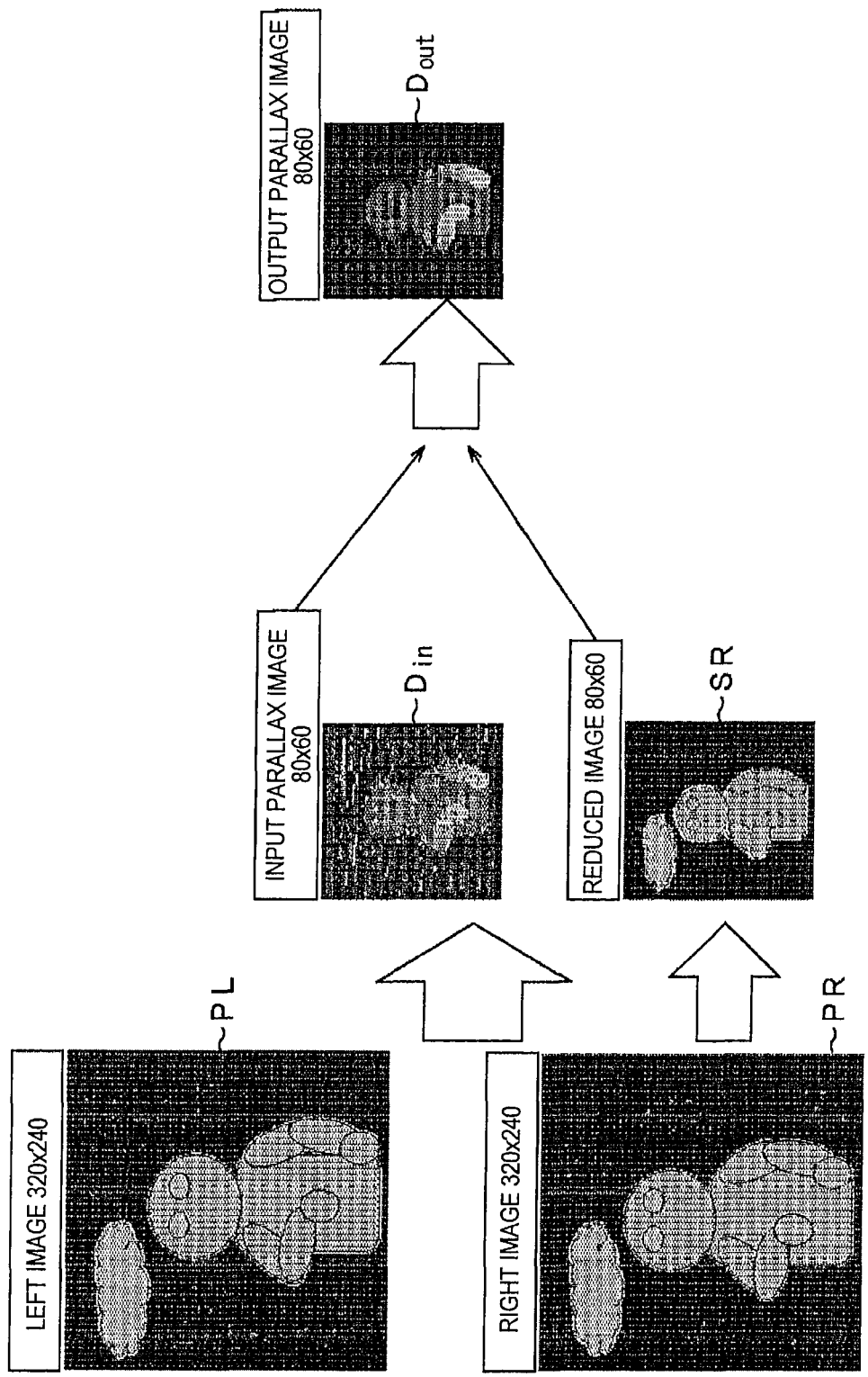
FIG. 7 is a view illustrating each image which is obtained from a left image and a right image.

For example, as shown in FIG. 7, the image processing device 101 receives a left image PL and a right image PR, which are captured by a stereo camera or the like. The left image PL and the right image PR are, for example, black-and-white images each made up of 320 pixel×240 pixel.

For example, the block stereo matching section 111 performs a stereo matching process on a block size BlockSize of 4 pixel×4 pixel of a block unit to generate an input parallax image $D_{in}$ made up of 80 pixel×60 pixel.

The stereo matching process is performed to obtain parallax of each point of an image selected as a base image from among the left image and the right image with different viewpoints by searching for each point of the other non-selected image corresponding to each point of the base image from an area corresponding to a search range of the other non-selected image.

Referring to FIG. 7, since one parallax is obtained from each block of the right image PR selected as the base image, the size of the obtained input parallax image $D_{in}$ becomes a quarter of the size of the right image PR horizontally and vertically. Accordingly, a pixel value of a pixel at the coordinates (x,y) of the input parallax image $D_{in}$ in the X-Y coordinate system represents parallax between a block of the right image PR where pixels at the coordinates (4x,4y) and (4x+3, 4y+3) on the right image PR are taken as opposing apexes to each other and a block of the left image PL which corresponds to the block of the right image PR.

The input parallax image $D_{in}$ thus obtained is considered an image which is to be subjected to the spatio-temporal filtering process, i.e., an image which corresponds to the input image $I_{in}$ of FIG. 1. In general, the input parallax image obtained by the stereo matching process contains a lot of errors. That is, since there may be some pixels having not pixel values representing actual parallax (true values) among pixels of the input parallax image, the input parallax image may be considered an image containing a lot of noise.

The image reduction section 112 generates a reduced image SR by reducing the right image PR, which is selected as the base image in the stereo matching process, to a quarter of the size of the right image PR horizontally and vertically. Accordingly, the size of the reduced image SR is the same as the size of the input parallax image $D_{in}$, i.e., 80 pixel×60 pixel.

The reduced image SR thus obtained is an image with a reduced camera noise by the reduction process. The reduced image SR is an image which has a reduced camera noise by the reduction process and is highly spatially correlated with the original right image PR or the input parallax image $D_{in}$. In particular, the reduced image SR has a less noise component compared to the input parallax image $D_{in}$.

In the image processing device 101, the reduced image SR is a reference image with respect to the input parallax image $D_{in}$ which is to be subjected to the spatio-temporal filtering process, i.e., which is to be subjected to the noise reduction. In other words, the reduced image SR is an image corresponding to the reference image $G_{in}$ of FIG. 1.

Further, the spatio-temporal filter section 114 generates an output parallax image $D_{out}$ by referencing the reduced image SR and performing the spatio-temporal filtering process on the input parallax image $D_{in}$. The output parallax image $D_{out}$ thus generated is an image which corresponds to the input parallax image $D_{in}$ with the noise eliminated therefrom. The output parallax image $D_{out}$ is an image with the same size as that of the input parallax image $D_{in}$, i.e., an image made up of 80 pixel×60 pixel. The output parallax image $D_{out}$ corresponds to the filter output image $I_{out}$ of FIG. 1.

Description of Parallax Detection Process

The operation of the image processing device 101 will be described.

If the image processing device 101 receives a stereoscopic image made up of the left image and the right image and is instructed to detect parallax of the stereoscopic image, the image processing device 101 performs a parallax detection process to generate an output parallax image. The parallax detection process of the image processing device 101 will be described with reference to the flow chart of FIG. 8.

In step S61, the block stereo matching section 111 performs the stereo matching process based on the left image and the right image.

For example, the block stereo matching section 111 calculates the sum of absolute values of differences, $SAD_{RightBase}$ (x,y,d), for the parallax d with respect to a pixel of interest from the following equation 7, where the pixel of interest is a pixel located at the coordinates (x,y) of the input parallax image $D_{in}$.

$$SAD_{RightBase}(x, y, d) = \sum_{i=0}^{BlockSize-1} \sum_{j=0}^{BlockSize-1} |L(4x + i + d, 4y + j) - R(4x + i, 4y + j)| \quad (7)$$

In the equation 7, L(4x+i+d,4y+j) represents a pixel value of a pixel at the coordinates (4x+i+d,4y+j) of the left image PL, and R(4x+i,4y+j) represents a pixel value of a pixel at the coordinates (4x+i,4y+j) of the right image PR. BlockSize represents the size of a block unit as a processing unit. In the present embodiment, BlockSize=4.

Accordingly, the sum of absolute values of differences, $SAD_{RightBase}$(x,y,d), is calculated by obtaining the sum of absolute values of differences between a pixel value of each pixel within a block to be processed on the right image PR and a pixel value of each pixel within an area on the left image PL, which is located at a position deviated by the parallax d in the x-direction from the same position as that of the block on the right image PR. In this case, the block to be processed on the right image PR is a 4 pixel×4 pixel of block including a pixel corresponding to the pixel of interest of the input parallax image $D_{in}$.

After obtaining the sum of absolute values of differences, $SAD_{RightBase}$(x,y,d), for each parallax d within a predetermined range, the block stereo matching section 111 selects the smallest of the sums of absolute values of differences and sets parallax d of the selected sum of absolute values of differences as parallax of the pixel of interest. That is, the value of the parallax d of the selected sum of absolute values of differences is a pixel value of the pixel of interest. For example, if the parallax d has a range from 0 to 63, the sum of absolute values of differences is calculated for each of the parallax values of 0 to 63.

The block stereo matching section 111 generates the input parallax image $D_{in}$ by setting each pixel of the input parallax image $D_{in}$ in turn as the pixel of interest and obtaining a pixel value of the pixel of interest. The block stereo matching section 111 supplies the obtained input parallax image $D_{in}$ to the multiplier 31 of the spatio-temporal filter section 114.

In the stereo matching process, left and right optical axes of the stereo camera for capturing the left and right images expected to be processed are calibrated beforehand so that the optical axes are parallel to each other. Further, the parallax d of the left image and the right images is calculated by setting the parallax d to zero at infinity.

The parallax detection of the left image and the right image is not limited to the method of using the sum of absolute values of differences in luminance from the equation 7, but may use any method of comparing a small area on an image selected as the base image and a small area within a search region of the other non-selected image and calculating an evaluation value representing a degree of similarity between texture patterns of these small areas. For example, the sum of squares of differences or the normalized correlation may be used as the evaluation value.

Further, the parallax d may be obtained by minimizing a cost function using dynamic programming, where the cost function is defined as imposing a constraint condition that the parallax d is continuously changed in the horizontal direction (x-direction).

Further, the parallax d may be obtained by obtaining the sum of absolute values of differences, $SAD_{LeftBase}(x,y,d)$, from the following equation 8 when the left image is selected as the base image, and combining the sum of absolute values of differences, $SAD_{RightBase}(x,y,d)$, and the sum of absolute values of differences, $SAD_{LeftBase}(x,y,d)$, so that errors in parallax detection may be stochastically reduced.

$$SAD_{LeftBase}(x, y, d) = \sum_{i=0}^{BlockSize-1} \sum_{j=0}^{BlockSize-1} |L(4x + i, 4y + j) - R(4x + i - d, 4y + j)| \quad (8)$$

Figure 8:
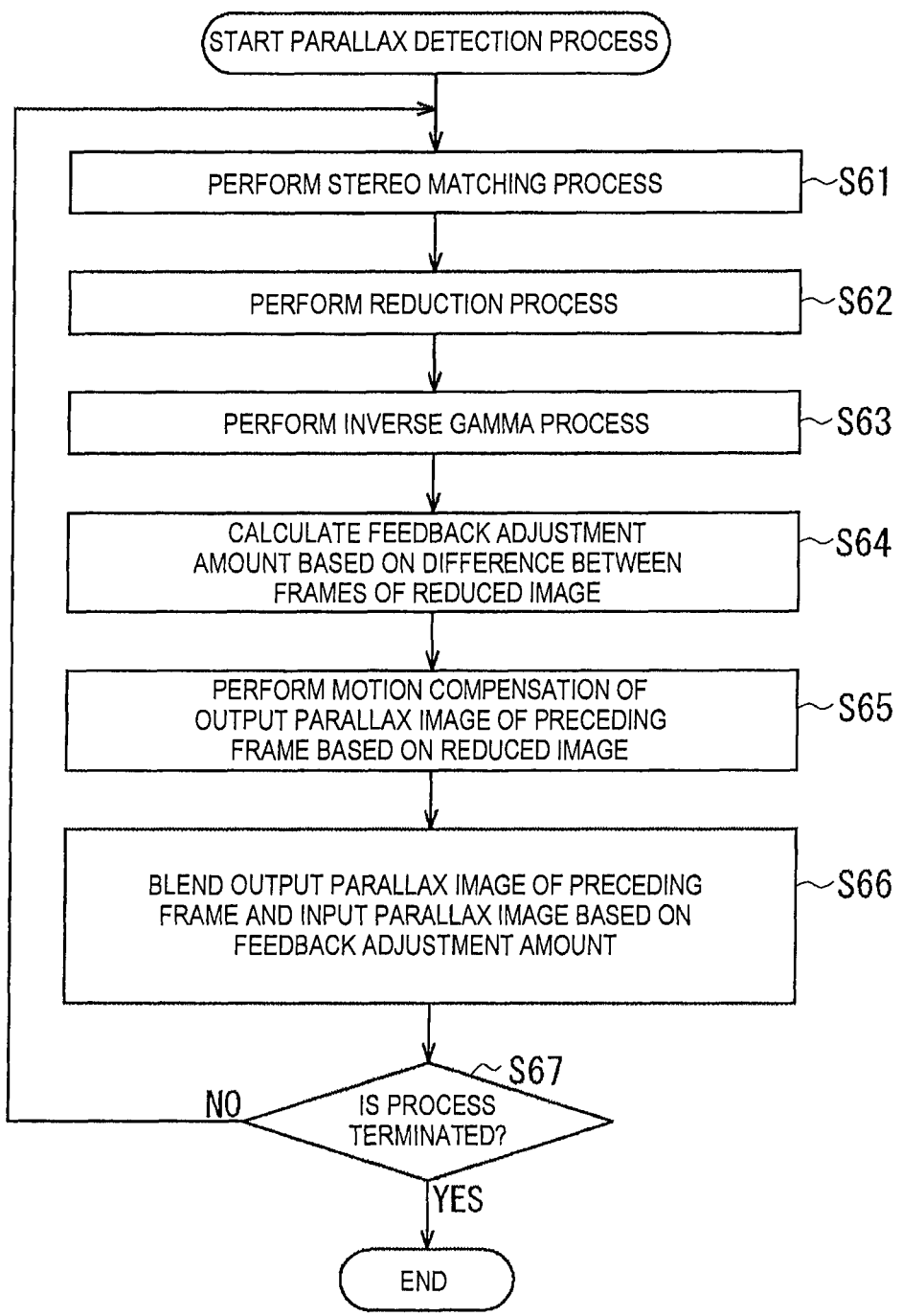
FIG. 8 is a flow chart illustrating a parallax detection process.

Referring back to the flow chart of FIG. 8, if the input parallax image is generated, the image reduction section 112 performs a reduction process on the supplied right image in step S62 to generate a reduced image SR with the same size as that of the input parallax image.

For example, the image reduction section 112 calculates a pixel value $R_{small}(x,y)$ of a pixel at the coordinates (x,y) in the reduced image SR from the following equation 9 by smoothing out a pixel value of a pixel within a predetermined size of a block on the right image.

$$R_{small}(x, y) = \frac{\sum_{j=0}^{BlockSize-1} \sum_{i=0}^{BlockSize-1} R(4x + j, 4y + i)}{BlockSize^2} \quad (9)$$

In the equation 9, R(4x+j,4y+i) represents a pixel value of a pixel at the coordinates (4x+j,4y+i) of the right image PR. BlockSize represents the size of a block unit as a processing unit in the stereo matching process in step S61. In the present embodiment, BlockSize=4.

Accordingly, an average value of a pixel value of a pixel within a block on the right image is a pixel value of a pixel of a reduced image corresponding to the block. Accordingly, by performing spatial anti-aliasing on the right image, it is possible to obtain a reduced image with a significantly reduced noise component.

The reduction process on the right image is not limited to the above-mentioned equation 9, but may be performed by another reduction algorithm, such as cubic interpolation (bicubic interpolation).

The image reduction section 112 supplies the obtained reduced image to the inverse gamma section 113, and the parallax detection process proceeds to step S63.

In step S63, the inverse gamma section 113 performs an inverse gamma process on the reduced image supplied from the image reduction section 112 and supplies the inverse-gamma-processed reduced image to the frame memory 21, the motion detection section 22 and the motion compensation section 24 in the spatio-temporal filter section 114.

For example, the inverse gamma section 113 performs the inverse gamma process on the pixel value $R_{small}(x,y)$ of the pixel at the coordinates (x,y) on the reduced image SR to calculate a pixel value $R_{small}'(x,y)$ of the pixel after the inverse gamma process from the following equation 10.

$$R_{small}'(x,y) = Gamma_{inv}(R_{small}(x,y)) \quad (10)$$

In the equation 10, the function $Gamma_{inv}(k)$ is a function expressed by, for example, the following equation 11.

$$Gamma_{inv}(k) = N(k/N)^r \quad (11)$$

In the equation 11, N denotes the maximum possible value of the pixel value $R_{small}(x,y)$, i.e., k. For example, if the pixel value k is any one of 0 to 255 in 8 bits, N=255. Further, r denotes a gamma value. The gamma value r is used so that the fluctuation of the noise becomes constant with respect to the amount of the input signal (pixel value of the pixel). For example, the gamma value is r=1.5.

Figure 9:
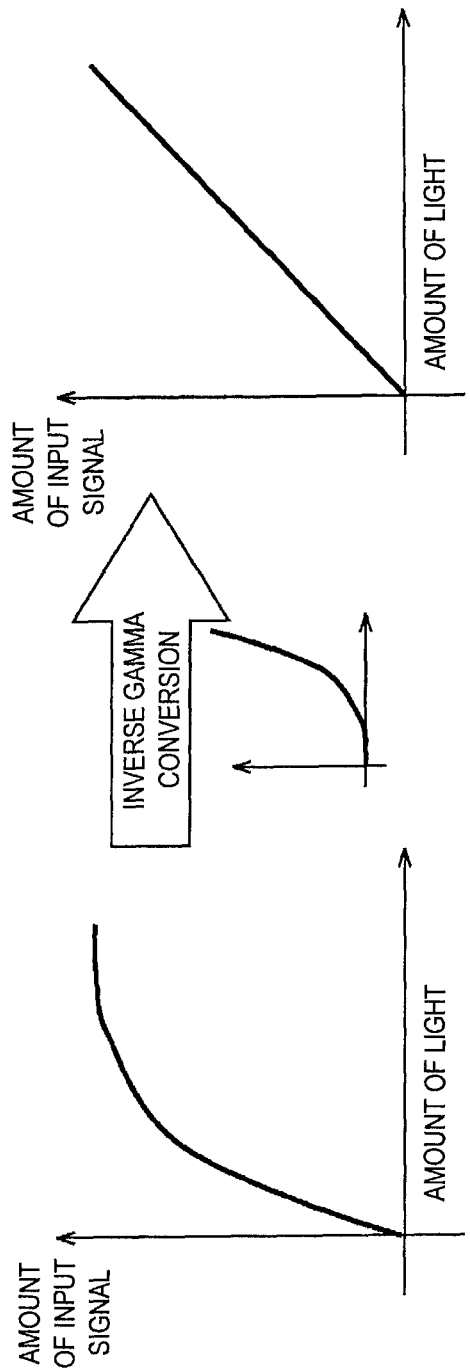
FIG. 9 is a view illustrating an inverse gamma process.

A camera for capturing a left image or a right image generally performs gamma correction on an image to obtain a dynamic range per the number of bits. For example, as shown in the left of FIG. 9, the fluctuation of a value due to noise tends to increase as the amount of an input signal (pixel value) is small. In order to reduce this tendency, the inverse gamma process (inverse gamma conversion) is performed on the image as necessary, thereby correcting the fluctuation of the value as shown in the right of FIG. 9.

In FIG. 9, the vertical axis indicates the amount of an input signal (pixel value) and the horizontal axis indicates the amount of light which is incident on a pixel (sensor) for capturing an image.

After performing the inverse gamma process on the reduced image, the inverse gamma section 113 supplies the inverse-gamma-processed reduced image as a reference image to the spatio-temporal filter section 114. The inverse gamma process is not limited to the calculation of the above-mentioned equation 10, but may be performed by piecewise linear approximation or table lookup.

After the inverse gamma process is performed on the reduced image, the steps S64 to S67 are performed and the parallax detection process is terminated. The steps S64 to S67 are the same as the steps S11 to S14 in FIG. 2 and a detailed description thereof will thus be omitted.

However, in the steps S64 to S67, the feedback adjustment amount is calculated based on the difference between frames of the reduced image and at the same time the motion compensation of the output parallax image of the preceding frame is performed based on the reduced image. Then, the motion-compensated output parallax image and the input parallax image of the current frame are blended and the output parallax image of the current frame is generated.

As such, the image processing device 101 generates the output parallax image with a reduced noise by generating the input parallax image by the stereo matching process and at the same time reducing the right image to generate the reduced image, and performing the spatio-temporal filtering process on the input parallax image using the reduced image as a reference image.

In the spatio-temporal filtering process, it is possible to simply obtain the output parallax image with a less noise component by determining the feedback adjustment amount based on the motion of the reduced image or performing the motion compensation of the output parallax image of the preceding frame.

In general, although the input parallax image obtained by the stereo matching process contains a lot of noise component due to a matching error, the left and right images which are sources of the input parallax image contain a less noise component than the input parallax image since the left and right images are highly spatially correlated with the input parallax image. In a system acquiring a reduced parallax by the block stereo matching, such as the image processing device 101, it is possible to obtain a high noise-reduction effect by setting the input parallax image, the reduced image, and the output parallax image as the input image, the reference image, and the filter output image, respectively, and performing the spatio-temporal filtering process.

In particular, while the system acquiring a reduced parallax by the block stereo matching uses the reduced image, which is obtained by reducing the original right image selected as the base image in the block stereo matching to fit the input parallax image, as the reference image, such a reduction process is the spatial anti-aliasing of the image. Accordingly, since it is possible to obtain an image with a significantly reduced noise component using the reference image by the reduction process, it is possible to very effectively reduce the noise component during the spatio-temporal filtering process.

Further, in general, the spatial motion compensation process is high in processing costs. However, if an image, such as a parallax image, which is spatially continuously changed is assumed, motion compensation may be only performed by anti-aliasing of the image by the application of the spatial weight to a pixel neighboring to the pixel of interest of the output parallax image of the preceding frame using the amount of difference between the pixel of interest of the reference image of the current frame and a pixel neighboring to the pixel of interest in the reference image of the preceding frame. As such, it is possible to easily realize the motion compensation with a simple process.

The above-described series of processing may be performed by hardware or may be performed by software. When the series of processing is performed by software, a program forming the software is installed into a computer that is incorporated in a dedicated hardware, or installed from a program storage medium into a general-purpose personal computer, for example, that can perform various types of functions by installing various types of programs.

Figure 10:
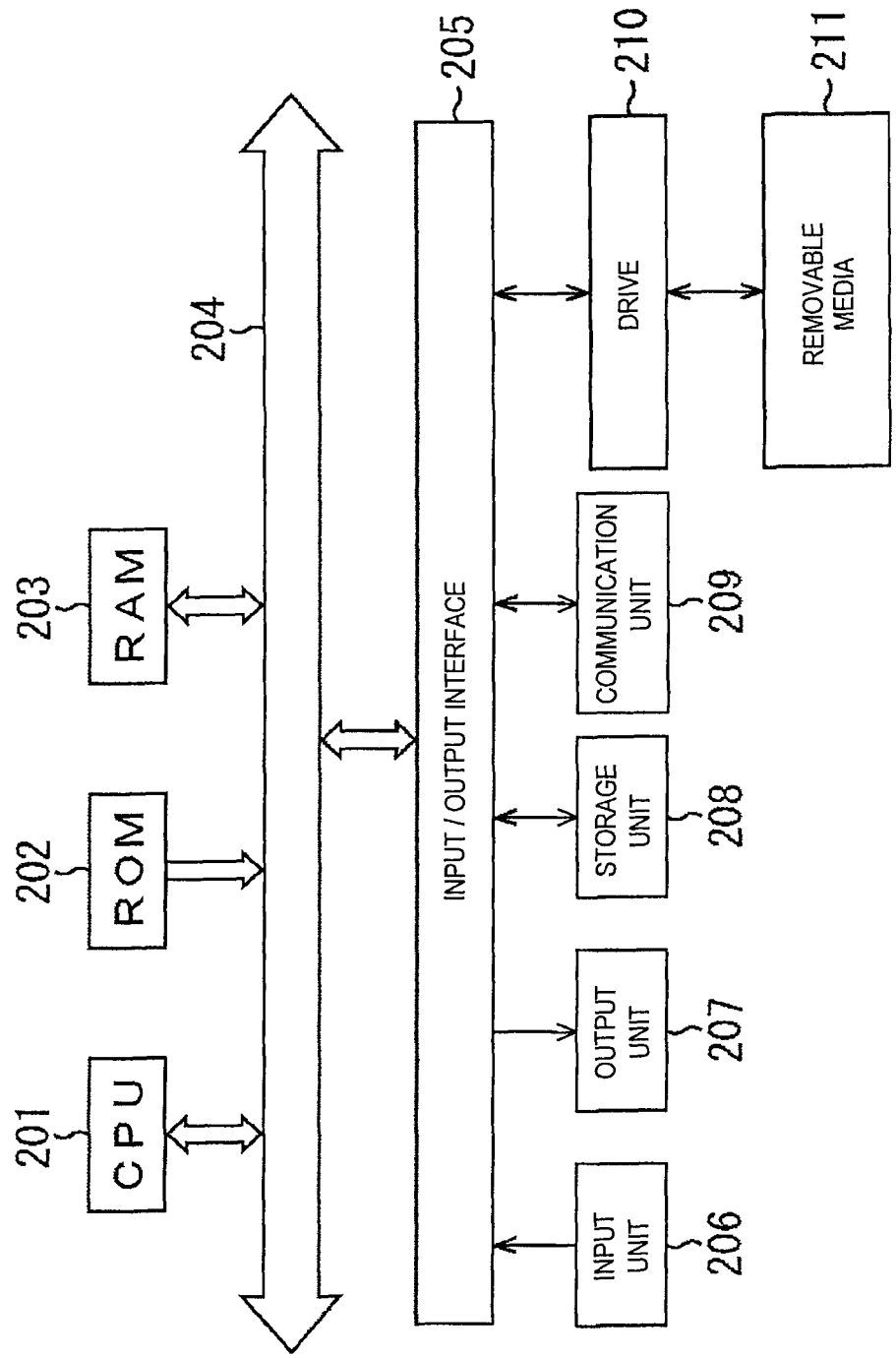
FIG. 10 is a view illustrating a structure of a computer.

FIG. 10 is a block diagram showing a hardware configuration example of a computer that performs the above-described series of processing using a program.

In the computer, a central processing unit (CPU) 201, a read only memory (ROM) 202 and a random access memory (RAM) 203 are mutually connected by a bus 204.

Further, an input/output interface 205 is connected to the bus 204. Connected to the input/output interface 205 are an input unit 206 formed by a keyboard, a mouse, a microphone and the like, an output unit 207 formed by a display, a speaker and the like, a storage unit 208 formed by a hard disk, a nonvolatile memory and the like, a communication unit 209 formed by a network interface and the like, and a drive 210 that drives a removable media 211 that is a magnetic disk, an optical disc, a magneto-optical disk, or a semiconductor memory.

In the computer configured as described above, the CPU 201 loads a program that is stored, for example, in the storage unit 208 onto the RAM 203 via the input/output interface 205 and the bus 204, and executes the program. Thus, the above-described series of processing is performed.

The program executed by the computer (the CPU 201) is recorded in the removable media 211, which is a package media formed by, for example, a magnetic disc (including a flexible disk), an optical disk (a compact disc read only memory (CD-ROM), a digital versatile disc (DVD) or the like), a magneto optical disk, or a semiconductor memory etc. Alternatively, the program is provided via a wired or wireless transmission media, such as a local area network, the Internet and a digital satellite broadcast.

Then, by inserting the removable media 211 into the drive 210, the program can be installed in the storage unit 208 via the input/output interface 205. Further, the program can be received by the communication unit 209 via a wired or wireless transmission media and installed in the storage unit 208. Moreover, the program can be installed in advance in the ROM 202 or the storage unit 208.

It should be noted that the program executed by a computer may be a program that is processed in time series according to the sequence described in this specification or a program that is processed in parallel or at necessary timing such as upon calling.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image processing device including:

a calculation section configured to calculate a feedback adjustment amount based on a change in temporal direction of a reference image which is spatially correlated with an input image;

a motion compensation section configured to perform motion compensation on an output image, which is obtained from the input image of a preceding frame immediately preceding a current frame expected to be processed, based on spatial information of the reference image; and a blending section configured to generate the output image of the current frame by blending an interpolated output image obtained by the motion compensation and the input image of the current frame based on the feedback adjustment amount.

(2) The image processing device according to (1), wherein the motion compensation section is configured to generate the interpolated output image by applying a weight, which is determined by a difference in luminance between a pixel of interest on the reference image of the current frame and a pixel neighboring to the pixel of interest on the reference image of the preceding frame, to a pixel neighboring to the pixel of interest in the output image of the preceding frame.

(3) The image processing device according to (2), further including:

a parallax detection section configured to generate a parallax image as the input image, the parallax image indicating parallax between a right image and a left image for displaying a stereoscopic image; and a generation section configured to generate the reference image based on the right image or the left image.

The present disclosure contains subject matter related to that disclosed in Japanese Priority Patent Application JP 2011-267506 filed in the Japan Patent Office on Dec. 7, 2011, the entire content of which is hereby incorporated by reference.

What is claimed is:

1. An image processing device comprising:

a calculation section configured to calculate a feedback adjustment amount based on a change in temporal direction of a reference image which is spatially correlated with an input image;

a motion compensation section configured to perform motion compensation on an output image, which is obtained from the input image of a preceding frame immediately preceding a current frame expected to be processed, based on spatial information of the reference image; and a blending section configured to generate the output image of the current frame by blending an interpolated output image obtained by the motion compensation and the input image of the current frame based on the feedback adjustment amount.

2. The image processing device according to claim 1, wherein the motion compensation section is configured to generate the interpolated output image by applying a weight, which is determined by a difference in luminance between a pixel of interest on the reference image of the current frame and a pixel neighboring to the pixel of interest on the reference image of the preceding frame, to a pixel neighboring to the pixel of interest in the output image of the preceding frame.

3. The image processing device according to claim 2, further comprising:
   a parallax detection section configured to generate a parallax image as the input image, the parallax image indicating parallax between a right image and a left image for displaying a stereoscopic image; and
   a generation section configured to generate the reference image based on the right image or the left image.

4. An image processing method comprising:
   calculating a feedback adjustment amount based on a change in temporal direction of a reference image which is spatially correlated with an input image;
   performing motion compensation on an output image, which is obtained from the input image of a preceding frame immediately preceding a current frame expected to be processed, based on spatial information of the reference image; and
   generating the output image of the current frame by blending an interpolated output image obtained by the motion compensation and the input image of the current frame based on the feedback adjustment amount.

5. A non-transitory computer readable storage medium storing a program, which when executed by a computer, performs a process comprising:
   calculating a feedback adjustment amount based on a change in temporal direction of a reference image which is spatially correlated with an input image;
   performing motion compensation on an output image, which is obtained from the input image of a preceding frame immediately preceding a current frame expected to be processed, based on spatial information of the reference image; and
   generating the output image of the current frame by blending an interpolated output image obtained by the motion compensation and the input image of the current frame based on the feedback adjustment amount.

* * * * *